United States Patent [19]

Braun et al.

[11] Patent Number: 5,342,019
[45] Date of Patent: Aug. 30, 1994

[54] THROTTLE FLAP CONSTRUCTION FOR AN EXHAUST GAS DUCT OF AN INTERNAL COMBUSTION ENGINE

[75] Inventors: Hermann Braun, Friedrichshafen; Georg Ruetz, Immenstaad, both of Fed. Rep. of Germany

[73] Assignee: MTU Motoren- und Turbinen-Union Friedrichshafen GmbH, Friedrichshafen, Fed. Rep. of Germany

[21] Appl. No.: 113,214

[22] Filed: Aug. 27, 1993

[30] Foreign Application Priority Data

Sep. 2, 1992 [DE] Fed. Rep. of Germany ....... 4229299

[51] Int. Cl.$^5$ .............................................. F16K 1/22
[52] U.S. Cl. .................................... 251/305; 137/315
[58] Field of Search .................. 137/872, 875, 315; 251/305

[56] References Cited

U.S. PATENT DOCUMENTS

| | | | |
|---|---|---|---|
| 3,314,444 | 4/1967 | White, Jr. | 251/305 X |
| 3,406,903 | 10/1962 | Kidder | 251/305 X |
| 3,704,721 | 12/1972 | Schmitz et al. | 251/305 X |
| 3,799,434 | 3/1974 | Heidacker | 251/305 X |

FOREIGN PATENT DOCUMENTS

| | | |
|---|---|---|
| 2946747 | 5/1981 | Fed. Rep. of Germany. |
| 2947819 | 7/1981 | Fed. Rep. of Germany. |

Primary Examiner—John C. Fox
Attorney, Agent, or Firm—W. G. Fasse; W. F. Fasse

[57] ABSTRACT

A throttle flap construction (12) is installed in an exhaust gas duct (11). For the installation the duct wall is provided with a radially facing, axially extending narrow slot (20) centrally provided with a circular opening so that a flap disk (14) may pass radially inwardly through the slot while a bearing portion (17) of the flap disk (14) may pass through the central circular opening. During installation, the flap disk (14) extends vertically when the throttle unit is inserted, a cover (16) is bolted to a flange (11A) surrounding the slot (20) and the central opening (21). Thus, the duct (11) can be properly sealed without cutting entirely through the duct in a radial plane.

5 Claims, 1 Drawing Sheet

THROTTLE FLAP CONSTRUCTION FOR AN EXHAUST GAS DUCT OF AN INTERNAL COMBUSTION ENGINE

FIELD OF THE INVENTION

The invention relates to a throttle flap construction to be installed in an exhaust duct, primarily in an exhaust duct of an internal combustion engine for controlling in an open loop manner the flow of exhaust gases from an exhaust gas turbo-charger which can be switched off. Installation in an inlet port, for example, of an exhaust gas turbine is also possible.

BACKGROUND INFORMATION

Throttle constructions of this type include a flap disk operated by a shaft to function as a closure member. The exhaust gas duct is equipped with an opening which extends approximately radially into the exhaust duct for mounting the closure member and for holding a bearing element for the operating shaft.

German Patent Publication (DE) 2,947,819 A1 discloses a throttle flap construction in which the closure member comprising a flap disk and an operating shaft is insertable into an end portion of the exhaust gas duct. For this purpose the end of the duct must be accessible so that the flap construction can be inserted axially into the inner diameter of the duct. This requirement poses difficulties if an open duct end is not readily available. In that case, it is necessary to cut the duct crosswise for installing the known throttle flap construction. Further, it is necessary that the diameter of the flap disk of the closure member is smaller than the inner diameter of the exhaust gas duct at the point of installation. As a result of this requirement it has been found that a sealed installation of the throttle flap construction into the exhaust gas duct is difficult, if not impossible. Thus, a complete sealing of the exhaust gas duct is not assured. However, such complete sealing of the duct must be met in an exhaust duct for an exhaust gas turbo-charger that has a switch-off feature.

German Patent Publication (DE) 2,946,747 A1 discloses an embodiment in which the throttle flap construction is insertable into the exhaust duct from the side in a substantially radial direction through an opening in the duct which is closeable by a flange of the throttle construction.

OBJECTS OF THE INVENTION

In view of the foregoing it is the aim of the invention to achieve the following objects singly or in combination:

to construct a throttle flap device in such a manner that it can be installed in the exhaust gas duct of an internal combustion engine without the need of having a free end of the exhaust gas duct available for the installation;

to avoid the above mentioned cross-cut in the exhaust duct when a closure member of the throttle flap construction or device is to be installed in the exhaust duct; and to make certain that the installed flap construction will completely seal the exhaust duct when the flap is in the closed position so that there is no gas flow from one exhaust duct section to the other.

SUMMARY OF THE INVENTION

The above objects have been achieved according to the invention in a throttle flap construction, wherein a radially directed or facing mounting opening in the exhaust duct wall is an axially oriented narrow slot through which the flap disk is insertable, including the operating shaft for the flap disk, and wherein a flange or cover is so arranged that the slot opening is closed by the flange or cover and so that the operating shaft for the closure disk is mounted in the cover or flange.

The invention achieves the following advantages. The throttle flap construction forms a complete structural unit that is installable in the exhaust duct without the need for an axial end opening in the duct. In fact, the present construction can be installed anywhere along the exhaust duct in a suitable position without thereby causing additional costs that are otherwise caused by the need for opening the exhaust gas duct entirely in its crosswise direction. A proper seal of the exhaust duct is provided by the flange that covers the narrow axial slot. A further advantage is seen in that the structural unit comprises a minimum of individual parts, each of which can be produced in a cost efficient manner so that the structural unit of the throttle flap construction can also be produced in a cost efficient manner. A further important advantage is seen in that the narrow slot opening for the installation of the throttle construction can be milled into the exhaust duct without any substantial effort and expense. Further, the present flap construction can also be used in inlet ducts, for example, of an exhaust gas turbine.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
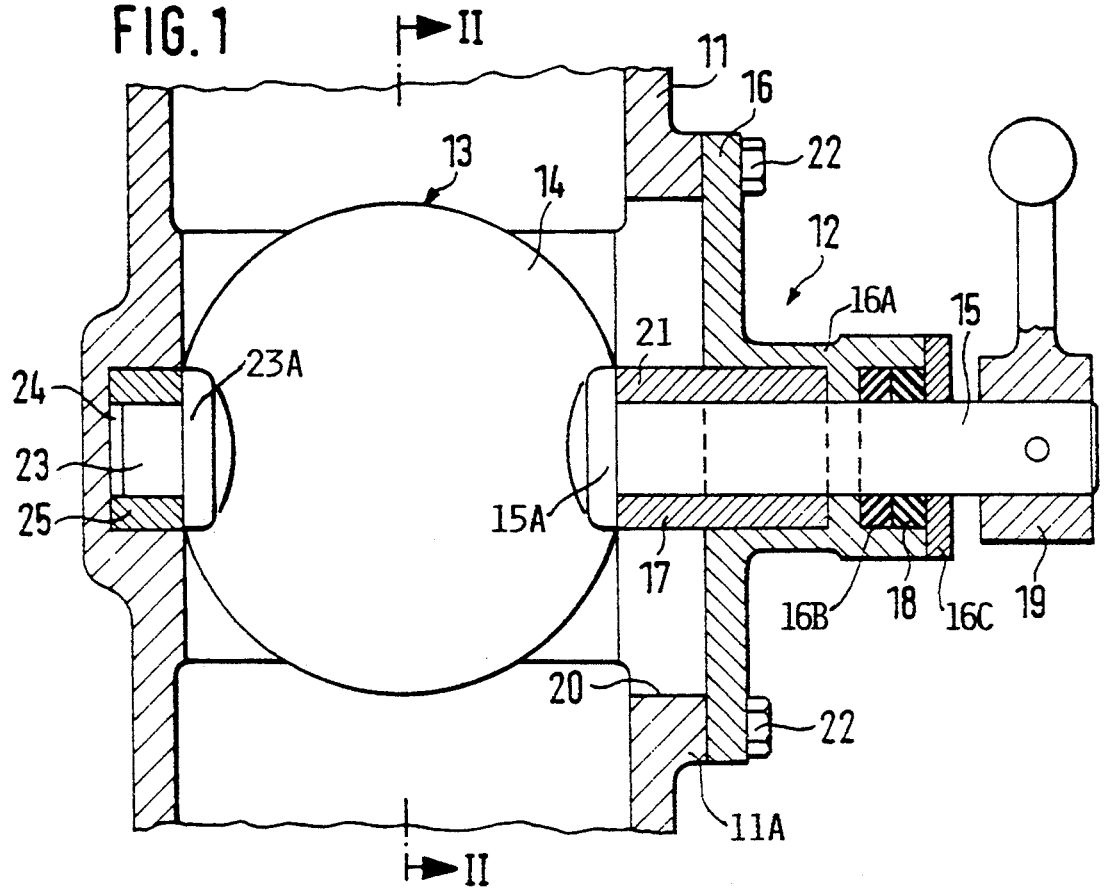
FIG. 1 shows a longitudinal section through an exhaust gas duct with a throttle flap device of the invention shown with the closure flap in its open position, whereby the section extends along line I—I in FIG. 2.
Figure 2:
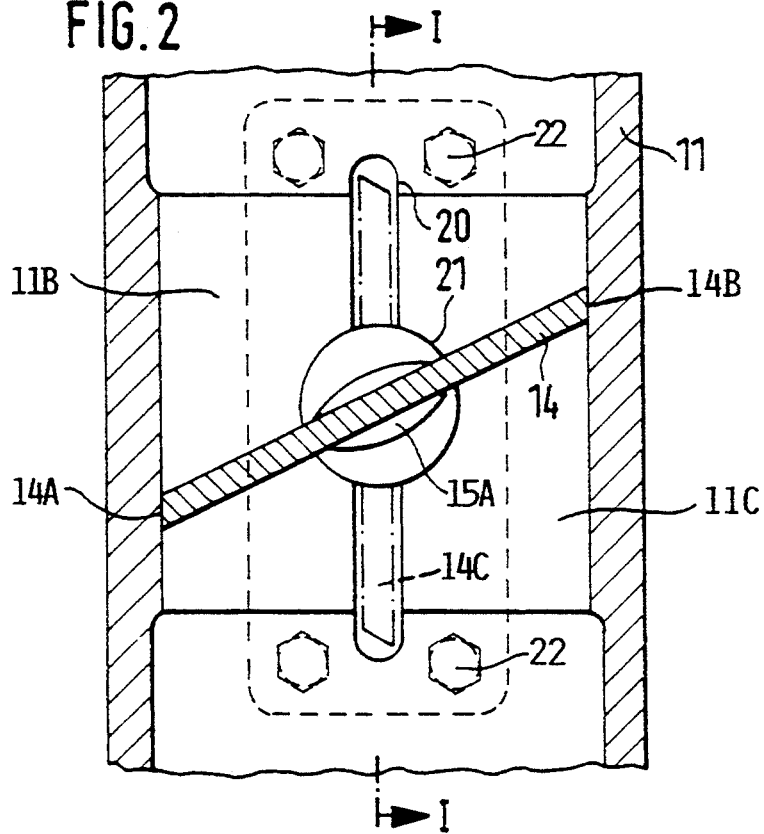
FIG. 2 is a longitudinal section along section line II—II in FIG. 1 showing the flap in its closed position.

FIGS. 1 and 2 taken in conjunction show an exhaust gas duct 11 of an exhaust gas turbo-charger that can be switched off. For this purpose the duct 11 is equipped with a throttle flap construction 12 which can open or close the duct flow cross-sectional area. FIG. 1 shows the open state, wherein the closure member 13 with its flap disk 14 and its operating shaft 15 are so positioned that the flap disk 14 extends vertically in the flow cross-sectional area of the duct 11. In FIG. 2 the closed position shows that the flap disk 14 with its chamfered edges 14A and 14B rests against the inner surface of the duct wall thereby completely sealing the cross-sectional flow area in the duct 11. The dash-dotted line in FIG. 2 shown at 14C shows also the open position of the flap disk 14.

The operating shaft 15 is rotatably mounted in a neck section 16A of a cover 16 secured to a flange portion 11A in the duct 11 surrounding a vertical slot 20. A bearing element 17, such as a slide bearing mounts the shaft 15 in the neck portion 16A of the cover 16. The neck portion 16A also has a chamber 16B holding at least one sealing element 18. The chamber 16B is closed by a cover 16C. The right-hand end of the shaft 15 carries a handle 19 for operating the flap disk 14 back and forth between the open and closed positions.

The closure member 13, or rather the disk 14 of the closure member 13 is rotatably mounted on an axle stud 23 secured to the disk 14 at 23A. The axle stud 23 is held rotatably by a bearing 25, such as a sleeve bearing mounted in a chamber 24 in the side wall of the duct 11.

For installing the throttle flap construction 12, the portion of the side wall of the duct 11 surrounded by the flange 11A is formed with a slot 20, whereby the slot extends axially and is just wide enough to pass the disk 14 through the slot 20. The slot 20 extends vertically so that at the time of the installation the disk 14 is in its open position. The slot 20 faces radially inwardly, but as mentioned, extends axially through the side wall of the duct 11. In its center portion the slot 20 is interrupted by a circular opening 21 through which the bearing 17 extends. The right-hand edge of the disk 14 is connected to the shaft 15 as shown at 15A. The bearing 17 centers the cover 16.

For mounting the closure member 13, first the disk 14 is assembled with its drive shaft 15 and the cover 16. The resulting structural unit is then inserted through the slot 20 and through the circular opening 21 in such a manner that the axle stud 23 can move radially toward and into the bearing 25. The flap disk 14 is vertically oriented for this purpose so that it can pass through the slot 20 as indicated with the dash-dotted line 14C in FIG. 2. When the insertion is completed, the cover 16 is bolted to the flange 11A by the bolts 22. Thus, the closure member 13 is supported at each end, so to speak, in the bearing 25 and in the bearing 17. There is sufficient axial play so that the opening and closing movement is not hindered when the closure member 13 expands under the influence of heat.

As shown in FIG. 2 the flap disk 14 in its closed position seals off one pipe section 11B from the other pipe section 11C.

Although the invention has been described with reference to specific example embodiments, it will be appreciated that it is intended to cover all modifications and equivalents within the scope of the appended claims.

What we claim is:

1. A throttle flap construction, comprising a flow duct (11) having a duct wall, a substantially radially facing axially extending slot (20) in said duct wall, a flap disk (14) fitting through said slot (20), a drive shaft (15) connected to said flap disk (14) to form a closure unit, a cover (16) for covering said slot (20), means connecting said cover to said duct, a first mounting bearing (17) for mounting said drive shaft (15) in said cover (16) so that a free end of said drive shaft extends outside said first bearing (17) when said flap disk (14) is inside said duct (11), means connected to said free end of said drive shaft (15) for rotating said flap disk inside said duct (11) from the outside of said duct, and a second mounting bearing (23, 25) in said duct wall opposite said first mounting bearing, said second mounting bearing holding said flap disk (14) in axial alignment with said drive shaft.

2. The throttle flap construction of claim 1, wherein said flap disk (14) is so dimensioned relative to a cross-sectional flow area of said duct, that in a closed position of said flap disk (14) said cross-sectional flow area is completely sealed off.

3. The throttle flap construction of claim 2, wherein said flap disk (14) has chamfered edges (14A and 14) slanting in opposite directions for resting against an inner surface of said duct wall when said flap disk is in said closed position.

4. The throttle flap construction of claim 1, wherein said slot (20) has a centrally positioned cylindrical opening (21), said first mounting bearing (17) extending centrally through said cylindrical opening, said cover (16) having a neck portion (16A) with an axial bore in which at least part of said first mounting bearing (17) extends, whereby said first mounting bearing (17) centers said cover (16) relative to said slot and relative to said centrally positioned cylindrical opening.

5. The throttle flap construction of claim 1, wherein said slot (20) has a circumferential slot width just sufficient for said flap disk to pass through when said flap disk extends vertically, said slot having an axial length just sufficient for a diameter of said flap disk to pass through.

* * * * *